θ = ANGLE BETWEEN POLARIZATION OF REFLECTED BEAM AND ANALYZER

INVENTOR
STANLEY J. LINS

United States Patent Office 3,445,833
Patented May 20, 1969

---

3,445,833
SIGNAL RESPONSIVE APPARATUS WITH A POLAR AZIMUTH VIBRATOR
Stanley J. Lins, Minneapolis, Minn., assignor to Sperry Rand Corporation, New York, N.Y., a corporation of Delaware
Filed Nov. 1, 1965, Ser. No. 505,934
Int. Cl. G11b 5/00
U.S. Cl. 340—174.1                                3 Claims

---

ABSTRACT OF THE DISCLOSURE

A method for sensing the magnetic state of a thin ferromagnetic film by utilizing the Kerr effect. Light from a suitable source is passed through a polarizer and reflected off of the ferro-magnetic film being sensed. The reflected polarized light is passed through a polar azimuth vibrator (PAV) which varies the plane of polarization of the reflected light such that the output therefrom when applied through an analyzer to a photodetector causes electrical signals to be produced which are representative of the periodically occurring light. The angle between the direction of the plane of polarization of the reflected light incident on the analyzer and the transmission axis of the analyzer is adjusted such that the alternating current signal produced by the photodetector is a pure second harmonic of the fundamental frequency of the PAV. This second harmonic is indicative of the first magnetic state of the film being sensed. When the film is switched from its first magnetic state to its second state, the reflected light is so rotated with respect to the transmission axis of the analyzer that the fundamental of the driving signal of the PAV is produced by the photodetector to indicate that the film is in its second magnetic state.

---

Figure 1:
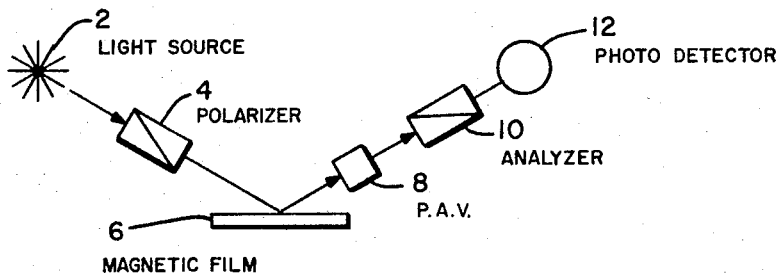

This invention relates to a method of using a magneto-optic detection system for nondestructively detecting the state or sense of magnetization of a thin magnetic film or a signal on a magnetically recorded track. More specifically, the invention relates to a magneto-optic read out system using frequency-amplitude or phase detection schemes to determine the state of magnetization of a particular memory element. The invention finds suitable application in reading the information stored in the memory portion of a computer such as is used in digital processing equipment.

Signals on a magnetically recorded track are normally read back by a read head in proximity to the track. The state of a magnetic thin film is normally determined by drive lines, read lines and sense lines associated with the thin film. In order to overcome obvious disadvantages attendant with these methods of read out, prior art systems utilize magneto-optic systems employing, for example, the Faraday effect and the Kerr magneto-optic effect to determine the magnetic state of these memory elements. See United States Patent Number 3,155,944 to Oberg et al. In the Oberg et al. patent, polarized light which is reflected from a film and rotated by the Kerr effect is passed through an analyzer which is rotated for near extinction of the reflected light when the film is magnetized in one stable state indicative of a binary "0," for example. With the analyzer held fixed in this position, when the remanent state of the film is switched by applying a suitable field, the plane of polarization of the reflected light will be rotated a predetermined angular distance in a predetermined direction, thereby resulting in a substantial increase in the light intensity. The light intensity increase in this example is indicative of a binary "1."

This solution to the problem is defective in that the signal-to-noise ratio is small. This occurs because the signal, which is the change of D.C. voltage level induced in the photomultiplier detector by the light intensity as the film changes from one state to another, is so small it is difficult to distinguish from the background noise inherent in photodetection systems.

Subsequent prior art systems attempt to obtain a larger change in light intensity, and thus a layer signal, when the state of the film is changed by operating at 45° on the $\cos^2 \theta$ curve. It is at this point that the greatest light intensity change occurs with a change in the magnetic state of the film. However, this signal is still relatively small. Furthermore, the increase in background light intensity increases photomultiplier tube shot noise thus decreasing the signal-to-noise ratio. See Fan et al., IEEE Transactions on Electric Computers, February 1963 pages 3–8.

In either case, any D.C. amplifier used to amplify these small signals must be very stable over long periods of time. Thus, stringent requirements are placed on any D.C. amplifier which must be used. By placing a chopper in the output circuit, the D.C. signal could be pulsed and an A.C. amplifier used. However, as will be shown later, the present invention improves substantially over systems using chopped outputs by reducing the effects of the background noise.

The present invention overcomes the above mentioned defects of the prior art and enables effective use of the magneto-optic effect to determine the magnetic state of a thin film or a signal recorded on a magnetic tape track. An improved signal-to-noise ratio is obtained by using a Polarization Azimuth Vibrator, PAV, such as an electrically alterable Senarmont Compensator or a Faraday Cell. For a description of a Senarmont Compensator, see the "Journal of the Optical Society of America," vol. 51, No. 4, April 1961, FIG. 1, page 462. The particular type of PAV to use depends upon the frequency at which the system is desired to operate. Faraday cells are low frequency devices whereas electrically alterable crystals such as Pockell cells as used in the above mentioned Senarmont Compensators are operable in the kilomegacycle range.

In the present invention, polarized light which is reflected from a film and rotated by the Kerr effect is passed through a PAV to an analyzer which is rotated for as near extinction of the reflected light as possible when the film is magnetized in one stable state indicative of a binary "0," for example. When the magnetic film is in the "0" state, for example, the PAV causes a small output signal to be produced which has twice the frequency of the PAV drive signal. When the film is in the "1" state, for example, the PAV causes an output signal to be produced that has the same frequency of the PAV drive signal and which has a large amplitude. Further, if it is desired, the point about which the analyzer operates may be adjusted to cause a first output signal to be produced that represents a "0" and that has the same frequency of the PAV drive signal as well as a large amplitude and a second output signal that represents a "1" and that has the same frequency and amplitude as the first output signal but which is 180° out of phase with the first signal. Thus, with this method, the output signal can be caused to change either in frequency with increased amplitude, or to vary in phase. Further, the rotating plane of polarization causes a variable light intensity output which enables A.C. amplifiers to be used without the necessity of choppers in the output circuit. Thus, by using a PAV to rotate the plane of polarization, the use of D.C. amplifiers and their stringent stability requirements are avoided.

Figure 2:
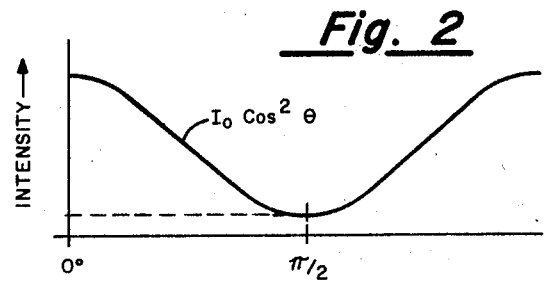
Figure 3A:
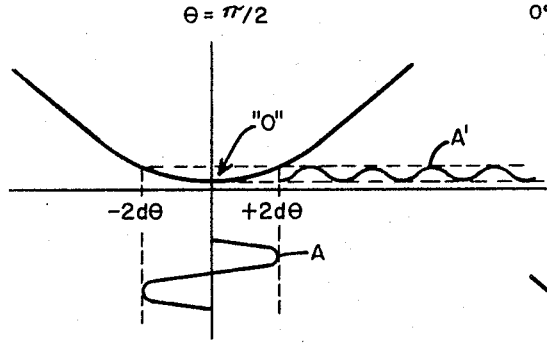
Figure 3C:
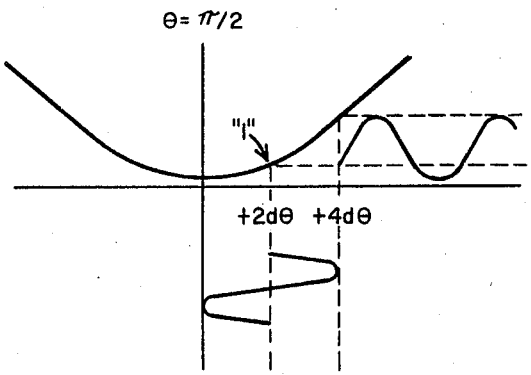
Figure 3B:
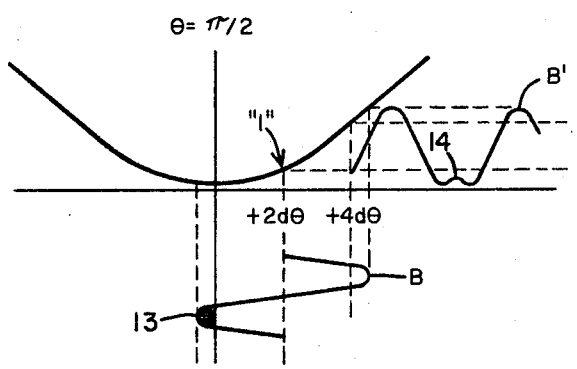
Figure 4:
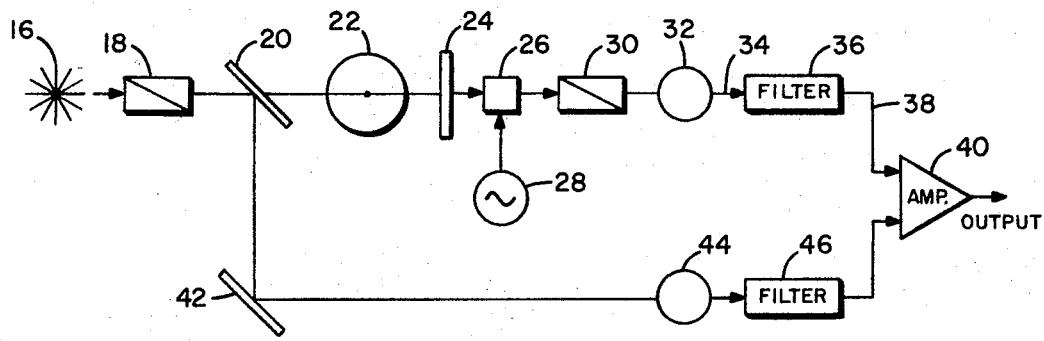
Figure 5:
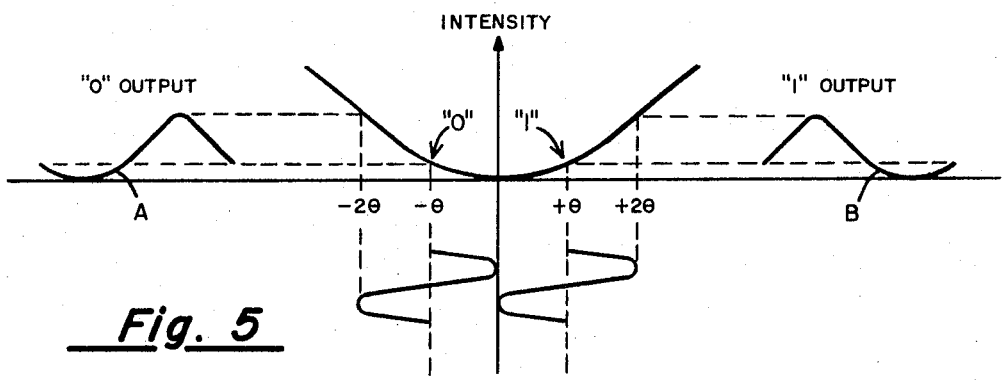
Figure 6:
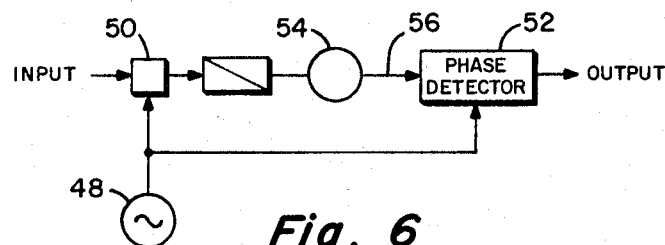

FIG. 1 shows a block diagram of the basic magneto-optical detector,

FIG. 2 is a graph of the variation of light intensity as the angle of an analyzer varies with respect to the polarization of the reflected light beam, FIGS. 3a–3c are graphs showing the output waveforms produced by the frequency-amplitude detector, FIG. 4 shows a block diagram of a double ended configuration of the frequency-amplitude detector which is used for noise rejection, FIG. 5 is a graph showing the output waveforms produced by the phase detector as the thin film element changes from a "0" to a "1" state, and FIG. 6 shows a block diagram of a circuit to detect the phase shift of the output that is produced as the magnetic element changes states.

As stated in the above patent to Oberg et al., the longitudinal Kerr effect occurs when plane-polarized light, i.e., all the light waves are vibrating parallel to a plane through the axis of the beam, is reflected at other than normal incidence from a thin film of magnetic material having its magnetization vector in the plane of the film, but at some angle other than normal to the plane of incidence, and the plane of polarization of the incident light is rotated. This rotation can also be effected by the polar Kerr effect or the Faraday effect. If the reflected light is examined with a light polarizing analyzer, it will be found that the reflected light cannot be completely extinguished. The reflected light is, therefore, said to be elliptically polarized due to the presence of the magnetic field of the thin film. Experiments conducted by C. C. Robinson, as reported in an article entitled "Measurement of the Kerr Magneto-Optic Effect in Nickel-Iron Films," appearing in Quarterly Progress Report #6 of the Massachusetts Institute of Technology Computer Components and Systems Group on pages 11 and 12 and dated Apr. 30, 1959, indicates that the Kerr effect, or the amount of rotation of the plane of polarization, can be accurately measured by passing the reflected light through a Faraday Cell which rotates the plane of polarization back and forth about the original orientation of the reflected beam, i.e. its orientation after its rotation by the Kerr effect. From the Faraday cell, the beam passes through an analyzer. When the analyzer transmission axis is precisely crossed with the plane of polarization of the reflected beam, the A.C. current produced by the PMT (photomultiplier tube) contains only the second harmonic of the modulation imparted by the Faraday cell. As the analyzer or the plane of polarization of the reflected light is rotated away from this position, the fundamental appears. The amplitude of the fundamental is a function of the angle between the direction of the plane of polarization of the reflected light incident on the analyzer and the analyzer transmission axis. The analyzer can then be rotated until the fundamental disappears in order to precisely determine the angle at which cross-polarization occurs. The amount of rotation of the analyzer required to produce this effect is a measure of the rotation caused by the Kerr effect. Accuracies of several seconds have been achieved by using this technique. See U.S. Patent No. 2,974,561 to Hardy et al., Mar. 14, 1961.

Applicant has recognized that the above device, when properly utilized, can directly detect binary information stored in computer storage devices such as magnetic thin films or magnetic tapes. As described above, previous applications utilized the device as a null detector requiring a physical rotation of the polarizing analyzer. The present invention differs in that it does not require physical intervention since no mechanical devices are moved in the binary detection scheme, it directly detects stored binary information, and, in one case, utilizes the fundamental of the PAV frequency to represent one binary state and the second harmonic of the PAV frequency to represent the other binary state. In another case, the fundamental PAV frequency is detected as a first or second phase representing first and second binary states respectively.

Consider FIG. 1 which shows the basic detector under discussion. Light source 2 produces unpolarized light which is passed through polarizer 4, focused on a magnetized surface such as thin film 6 and reflected through a PAV 8 and an analyzer 10 onto the cathode of a PMT 12. Polarizer 4 causes the light incident on the magnetized surface to be plane polarized. Upon reflection, the Kerr effect causes the axis of polarization to be rotated and a perpendicular component to be generated which introduces phase shifts into the components of the reflected light which, therefore, becomes elliptically polarized. FIG. 2 shows a graph of the intensity, I, of the light which strikes the PMT as a function of the angle, $\theta$, between the polarization of the reflected beam and the analyzer. It will be noted that the intensity, I, varies as the $\cos^2$ of $\theta$. It will also be noted that there is not a complete cancellation of light when $\theta$ is equal to 90° because of the ellipticity of the reflected light. The small perpendicular components of the reflected light are not cancelled out. In order to completely extinguish the reflected light, either a one-quarter wave plate must be used to remove the small component of the wave which is perpendicular to the plane of the incident light, or, as shown by the article to Fan et al., FIG. 5, when the polarizer is slightly rotated with respect to the plane of incidence, these small components can be cancelled and the signal-to-noise ratio can be a maximum.

*Frequency-amplitude detector*

The frequency-amplitude detector utilizes the characteristics of a nonlinear change of transmission as a function of $\theta$ near cross-polarization. The PAV, inserted between the magnetized surface and the analyzer, is made to oscillate at a high frequency, for example, 100 times the information rate. The information rate is defined as the number of elements whose state is being determined per second. For example, if a magnetic tape is being moved at a rate which presents 300,000 bits per second to be examined, the information rate is 300,000 bits per second and the PAV may operate at 30 megacycles. The oscillation of the PAV has the effect of oscillating the angle at which the analyzer is oriented. If the PAV is driven sinusoidally at a frequency, $\omega_c$, a photodetector will have an output of $\cos^2[\theta_1 \sin \omega_c t]$. The state of the film will determine the operating point around which $\theta$ will oscillate. Consider now FIG. 3A which is an enlarged portion of FIG. 2 near cross-polarization. Assume that the magnetized surface is a thin magnetic film and that it is arbitrarily in the "0" state. According to Robinson and Hardy, when the analyzer is precisely crossed with the plane of polarization of the reflected light, the detector current contains primarily the second harmonic of the modulation imparted by the PAV. Thus, the PAV driving signal A oscillates the azimuth of the reflected light around $\theta=90°$ between $-2d\theta$ and $+2d\theta$ and generates an output A' of low amplitude primarily at the second harmonic of the PAV driving frequency, $\omega_c$. This is the waveform shown in FIG. 3A'. As is well known, when the film is switched to the "1" state, it causes the plane of polarization of the reflected light to rotate. Thus, the point about which the PAV oscillates the azimuth of the reflected light is switched. This point, as shown in FIG. 3B, for example, may be $+2d\theta$. The proper amplitude of the oscillation produced by the PAV at this point may be determined by observing waveform B' in FIG. 3B. If the PAV driving signal, B', is of such an amplitude that is crosses the 90° axis, as shown by shaded portion 13 of waveform B, the amplitude of the output signal begins to increase again as shown by point 14 in output waveform B'. Thus, waveform B' begins to contain a large second harmonic of the PAV driving frequency. The amplitude of the driving signal can be varied until the fundamental clearly predominates over the second harmonic. The optimum output signal waveform would then appear as shown in FIG. 3C. This signal is at the fundamental driving frequency, $\omega_c$, and as can be seen, would appear to be of high amplitude because of the increased average slope of the $\cos^2 \theta$ response curve. However, in actual practice, when the amplitude of the driving signal is reduced to the point where the second harmonic completely disappears, the fundamental signal may become excessively noisy because of its reduced amplitude. Therefore, there should be a compromise PAV driving amplitude which will yield an acceptable signal output level comprising both the fundamental and second harmonic but still maintain an acceptable ratio of fundamental to second harmonic.

Therefore, it can be seen that when the thin film is in the "0" state, the output signal produced is a low amplitude, primarily second harmonic of the PAV driving signal. However, when the thin film is in the "1" state, the output signal produced is primarily the fundamental PAV carrier frequency of high amplitude. By placing a frequency and/or amplitude detector at the output of the PMT, a signal can be obtained which indicates the magnetic state of the surface from which the light is reflected.

FIG. 4 shows a schematic diagram of a double-ended frequency-amplitude modulation detector for noise cancellation purposes. Light source 16, a laser in the preferred embodiment, has its chief polarization component along the plane of transmission of the polarizer 18. A beam splitter 20, a partially silvered mirror, samples the laser light for laser-noise rejection purposes. The polarized laser beam is directed onto the magnetized surface 22, a thin film, for example. The reflected beam is now elliptically polarized by the Kerr effect. As is well known, a one-quarter wave plate 24 properly oriented restores the reflected light to rotated plane-polarized light. See Valasek, Theoretical and Experimental Optics, John Wiley & Sons, 1949, pages 218–220. The PAV 26, driven by signal source 28, then rotates the azimuth of the reflected beam around an operating point determined by the state of the film as described above. The analyzer 30 causes the light intensity onto the photomultiplier tube 32 to vary as $\cos^2 [\theta_1 \sin \omega_c t]$. The photomultiplier output on line 34 is an information signal which is fed into a bandpass filter circuit 36 resonant at the PAV driver frequency and with a bandwidth of twice the information rate to permit both sidebands to pass. The output is fed via line 38 into a differential amplifier 40. Beam splitter 20 allows a sample of the incident light to pass via full silvered mirror 42 into a second photomultiplier tube 44 and then through a second bandpass filter 46. The noise component which passes this circuit is fed into the other input of the A.C. differential amplifier 40 to cancel common-mode noise from the light source 16. This sample signal is obtained before the light strikes the element 22 since imperfections such as dust and surface roughness would otherwise cause an increase of average current. This current causes increased shot noise which is random and not cancellable. Film noise such as this is eliminated by the high frequency nature of the PAV modulation since noise such as this produces signals which are essentially D.C. which will not be passed by the A.C. differential amplifier 40.

*Phase detection*

By changing the setting of the analyzer i.e., the azimuth of the analyzer transmission axis, the frequency-amplitude modulated detector can be changed to a phase sensitive detector. In this scheme, the film element biases the operating center of $-\theta$ or $+\theta$ on the $\cos^2 \theta$ response curve depending on whether a "1" or a "0" is stored. The operating centers, $-\theta$ and $+\theta$ may be determined by adjusting the amplitude of the PAV driving signal while switching the film between the "1" and "0" states until the symmetrical but 180° out of phase signals (A) and (B) shown in FIG. 5 are obtained. Since the PAV is operating at a high frequency, each information signal will consist of many, as for example 100, carrier cycles.

FIG. 6 discloses a circuit for utilizing the phase sensitive pulses for producing signals representative of a stored "1" or a "0." The output signal from signal source 48 which drives PAV 50 is also coupled to phase detector 52. The information signal from PMT 54 on line 56 will be either waveform (A) or (B) in FIG. 5 and is also coupled to detector 52. If it is in phase with the signal from PAV driver 48, phase detector 52 will produce an output signal. If it is out of phase with the signal from the PAV driver 48, phase detector 52 will not produce an output signal. Thus, the magnetic state of the magnetic element can be determined by the phase sensitive detector.

The methods described above are superior to a chopper system in several respects. First, the chopper creates intensity pulses which are of necessarily low amplitude since the maximum intensity, assuming no background light, is proportional to $\cos^2 2d\theta$ where $2d\theta$ is the Kerr rotation. In the present invention, maximum light intensity is approximately $\cos^2 4d\theta$ since the Kerr rotation determines the operating center around which the PAV driving signal oscillates the azimuth of the reffected light $4d\theta$, i.e. $\pm 2d\theta$ or between $\theta=0$ and $\theta=4d\theta$. Another improvement over the chopper exists in that the PAV, in effect, does not act on unpolarized ambient light, but only polarized light. The chopper generates light pulses including ambient light whether polarized or not.

The optics required for this scheme are of such a nature that many or all channels can be handled simultaneously in parallel by one such optical system. The power required to operate the PAV is extremely small for the small angular displacements required.

Thus, applicant has disclosed magneto-optic schemes which operate at a good signal-to-noise ratio point, eliminate film noise with the use of A.C. amplifiers, permit frequency/amplitude detection, permit phase detection, avoid the use of D.C. amplifiers with their stringent stability requirements, and permit the operation of many channels simultaneously by one optical system.

Having now, therefore, fully illustrated and described my invention, what I claim to be new and desire to protect by Letters Patent is:

1. In a method of using a Kerr magneto-optic device including the steps of providing a source of polarized light, reflecting said polarized light from a magnetic device which is capable of being in first and second magnetic states, transmitting said reflected light through a polarization azimuth vibrator and an analyzer to a photomultiplier cell, driving the polarization azimuth vibrator with an oscillating signal to periodically vary the plane of polarization of the light falling on said analyzer to cause said photomultiplier cell to produce signals responsive to said periodically varying light, the improvement comprising the steps of:
   (a) adjusting the angle between the direction of the plane of polarization of the reflected light incident on said analyzer and said analyzer transmission axis such that the A.C. signal produced by said photomultiplier cell is a pure second harmonic of said driving signal indicative of said first magnetic state,
   (b) switching the magnetic state of said magnetic device from its first state to its second state, and
   (c) detecting the fundamental of said driving signal produced by said photomultiplier cell indicative of said second magnetic state of said device.

2. The method of claim 1 including the steps of:
   (a) transmitting a portion of said polarized light from said source to a second photomultiplier cell, and
   (b) coupling the output of said first and second photoelectric cells to an A.C. differential amplifier for cancelling noise components present in said polarized light from said source.

3. In a method of using a Kerr magneto-optic device including the steps of providing a source of polarized light, reflecting said polarized light from a magnetic device which is capable of being in first and second magnetic states, transmitting said reflected light through a polarization azimuth vibrator and an analyzer to a photomultiplier cell, driving the polarization azimuth vibrator with an oscillating signal to periodically vary the plane of polarization of the light falling on said anayzer to cause said photomultiplier cell to produce signals responsive to said periodically varying light, the improvement comprising the steps of:

(a) adjusting both the amplitude of said driving signal and the angle between the direction of the polarization of light incident on said analyzer and said analyzer axis such that a first signal is produced by said photomultiplier cell indicative of said first magnetic state, (b) switching the magnetic state of said magnetic device from its first state to its second state, (c) adjusting both the amplitude of said driving signal and the angle between the direction of the polarization of light incident on said analyzer and said analyzer axis such that a second signal 180° out of phase with said first signal produced by said photomultiplier cell indicative of said second magnetic state, (d) transmitting a portion of said polarized light from said source to a second photomultiplier cell, and (e) coupling the output of said first and second photomultiplier cells to an alternating current differential amplifier for cancelling noise components present in said polarized light from said source.

References Cited

UNITED STATES PATENTS 3,284,785  11/1966  Kornei _____ 340—174.1

BERNARD KONICK, Primary Examiner.

BARRY L. HALEY, Assistant Examiner.

U.S. Cl. X.R.

250—219; 340—174